(12) United States Patent
Harris et al.

(10) Patent No.: US 8,310,324 B2
(45) Date of Patent: Nov. 13, 2012

(54) RELEASABLE GUIDE AND METHODS FOR USING SAME

(76) Inventors: Will Harris, Spring, TX (US); Gerald Dasbach, Spring, TX (US)

( * ) Notice: Subject to any disclaimer, the term of this patent is extended or adjusted under 35 U.S.C. 154(b) by 583 days.

(21) Appl. No.: 12/101,844

(22) Filed: Apr. 11, 2008

(65) Prior Publication Data

US 2009/0256320 A1   Oct. 15, 2009

(51) Int. Cl.
*H01F 7/20* (2006.01)
(52) U.S. Cl. .............................. 335/285; 335/295
(58) Field of Classification Search ............ 335/205, 335/206, 209, 285–295
See application file for complete search history.

(56) References Cited

U.S. PATENT DOCUMENTS

| | | | |
|---|---|---|---|
| 4,411,350 A * | 10/1983 | Wolfram | 193/35 A |
| 4,571,479 A | 2/1986 | Maeda et al. | |
| 4,635,839 A | 1/1987 | Slavens | |
| 4,643,298 A | 2/1987 | Wallaart | |
| 4,677,916 A | 7/1987 | Dodd | |
| 5,099,098 A | 3/1992 | Burgoon | |
| 5,112,004 A * | 5/1992 | Tipton | 226/24 |
| 5,227,601 A | 7/1993 | Black | |
| 5,906,761 A | 5/1999 | Gilliland et al. | |
| 5,925,268 A | 7/1999 | Britnell | |
| 6,313,426 B2 | 11/2001 | Belloni et al. | |
| 6,429,404 B1 | 8/2002 | Suzuki | |
| 6,452,131 B2 | 9/2002 | Britnell | |
| 6,492,618 B1 | 12/2002 | Flood et al. | |
| 6,528,908 B1 | 3/2003 | Lee | |
| 6,548,783 B1 | 4/2003 | Kilovsky et al. | |
| 6,707,360 B2 | 3/2004 | Underwood et al. | |
| 6,866,077 B2 | 3/2005 | Zurmuhle et al. | |
| 6,927,360 B2 | 8/2005 | Artelsmair et al. | |
| 7,012,495 B2 | 3/2006 | Underwood et al. | |
| 7,647,681 B1 * | 1/2010 | Harris et al. | 29/281.1 |
| 2004/0239460 A1 | 12/2004 | Kocijan | |
| 2009/0242224 A1 * | 10/2009 | Hamura et al. | 173/152 |

FOREIGN PATENT DOCUMENTS

WO   2007/104082 A1   9/2007

OTHER PUBLICATIONS

International Searching Authority, "Notification of Transmittal of the International Search Report and the Written Opinion of the International Searching Authority, or the Declaration," PCT2009/039915 mailed Jun. 10, 2009.

* cited by examiner

*Primary Examiner* — Bernard Rojas
(74) *Attorney, Agent, or Firm* — Edmonds & Nolte, PC

(57) ABSTRACT

Apparatus and methods for guiding one or more tools are provided. In at least one specific embodiment, the apparatus for guiding one or more tools can include an elongated member. The elongated member can have one or more switchable magnets disposed thereon.

30 Claims, 5 Drawing Sheets

RELEASABLE GUIDE AND METHODS FOR USING SAME

BACKGROUND OF THE INVENTION

1. Field of the Invention

Embodiments of the present invention generally relate to apparatus and methods for metal working. More particularly, embodiments of the present invention relate to apparatus and methods for directing a tool.

2. Description of the Related Art

Techniques for welding metal plates or pipes together to make, for example, ship hulls, barges, pipelines, storage tanks, and other structures made from multiple pieces of metal are labor intensive. Automated systems have been developed to reduce costs, assure uniform weld seams, and to provide an overall lower finished cost product. Typical automated systems employ cameras, probes, or lasers to track weld seams. However, such systems lack precision, require extensive setup time, or are simply ineffective at guiding a welding head along a predetermined path.

Other automated systems have employed a guide or track for directing a welding head along a seam to be welded. Guides and/or tracks are often temporarily attached to a structure by using straps, clamps, rivets, or screws. In other instances guides and/or tracks have been tack welded to the work piece, requiring considerable time, effort, and expense. Such track-based welding systems are cumbersome, time consuming to install, and difficult to use. Moreover, the likelihood of damaging a work piece or welder when removing the guide and/or track increases exponentially, depending on the size of the weld and the welder's access to the weld.

There is a need, therefore, for a new apparatus and method for efficiently and effectively guiding a tool for metal working.

SUMMARY OF THE INVENTION

Apparatus and methods for guiding one or more tools are provided. In at least one specific embodiment, the apparatus for guiding one or more tools can include an elongated member. The elongated member can have one or more switchable magnets disposed thereon.

In at least one other specific embodiment, the apparatus can include an elongated body. The elongated body can include, but is not limited to at least two segments that are hinged together, and one or more switchable magnets disposed on at least one of the segments. The segments can include, but are not limited to two side walls disposed about a body. The body can provide a housing for the magnet.

In at least one specific embodiment, the method for guiding one or more tools can include locating a guide on a magnetically susceptible surface. The guide can include an elongated body. The elongated body can include, but is not limited to at least two segments that are hinged together, and one or more switchable magnets disposed on at least one of the segments. The segments can include, but are not limited to two side walls disposed about a body. The body can provide a housing for the magnet. At least a portion of the guide can be secured to the magnetically susceptible surface by switching at least one of the one or more switchable magnets to an on position. One or more tools can be positioned about the guide. The one or more tools can be moved along at least a portion of the guide.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
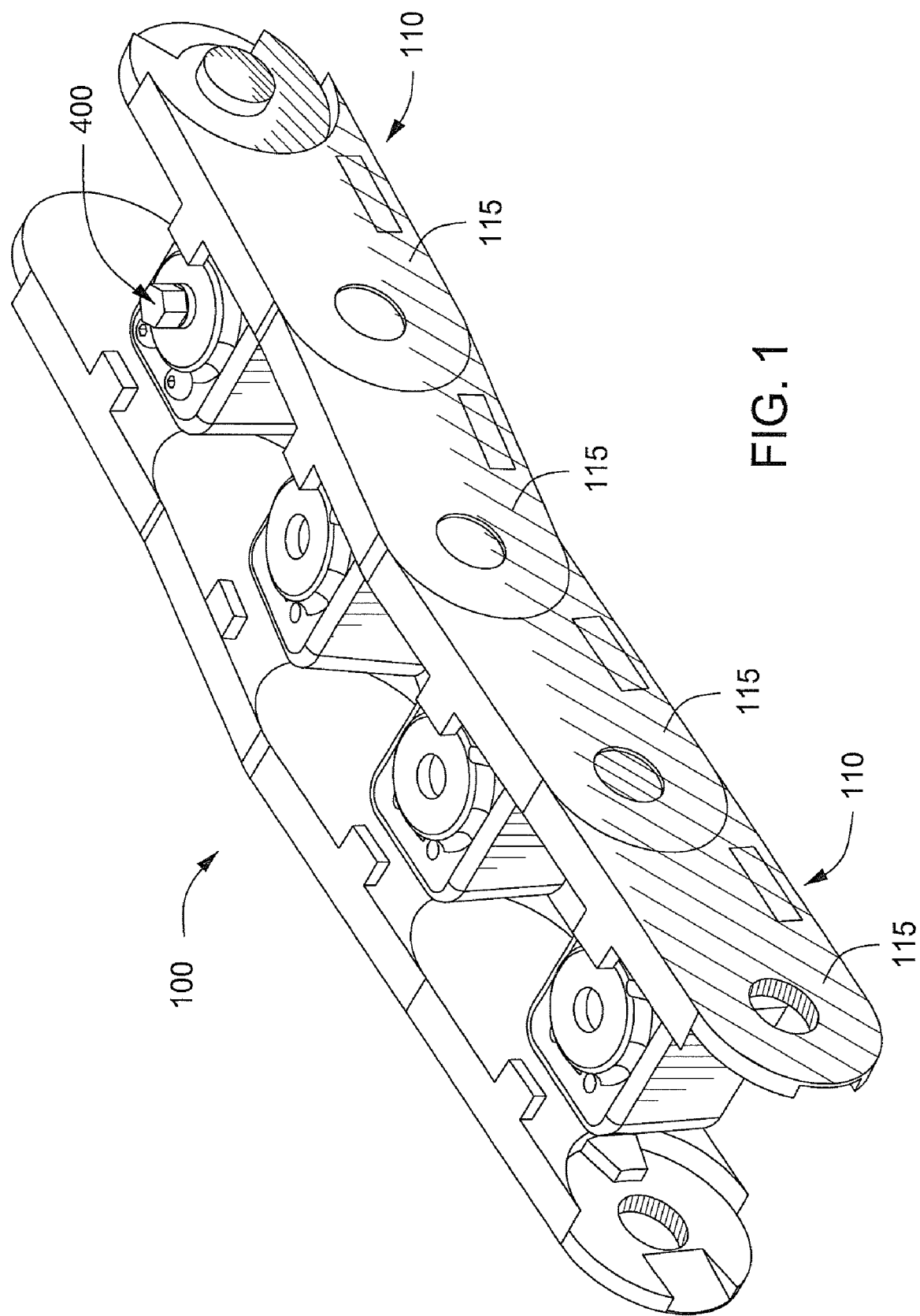
FIG. 1 depicts a schematic of an illustrative guide according to one or more embodiments described.

FIG. 1 depicts an isometric view of an illustrative guide or track 100 according to one or more embodiments. In one or more embodiments, the guide 100 can include two or more segments or components 115 (four are shown) that are hinged or otherwise connected to one another. Although not shown, the guide 100 can be a single continuous segment formed by a single integral strip or length of material. While FIG. 1 depicts four segments 115, any number of segments 115 can be used to provide a guide 100 of any desired length. Each segment 115 can provide a housing for one or more magnetic devices 400. As will be explained in more detail below, the magnetic device 400 can be used to provide a holding force between the guide 100 and a metallic surface, such as a metallic surface to be welded.

Figure 2:
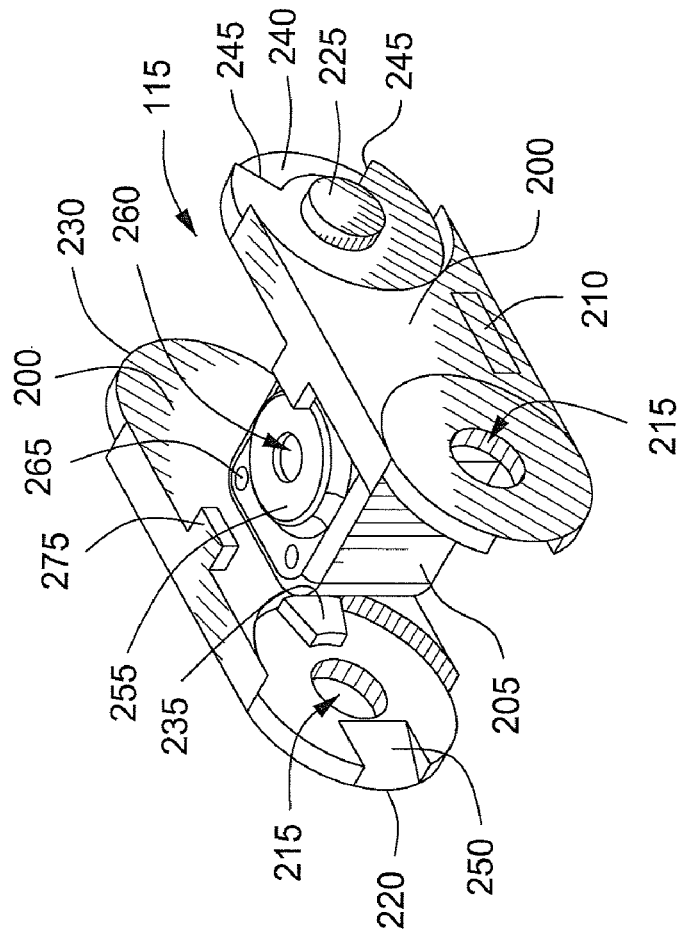
FIG. 2 depicts a plan view of an illustrative segment according to one or more embodiments described.

FIG. 2 depicts a plan view of an illustrative segment 115, according to one or more embodiments. Each segment 115 can include two side members 200 that are arranged on opposing ends of a housing or body 205. The housing 205 can be connected between the two side members 200 using any suitable method, such as adhesives, friction fit, screws, rivets, clamps, clips, springs, welding, and the like.

In at least one specific embodiment, the housing 205 can include one or more protrusions or tabs 210, and each side member 200 can include one or more holes or recesses for which to matingly engage with a tab 210. The one or more tabs 210 can extend from the housing 205 and can be inserted into the corresponding holes or recesses in the side members 200 to secure the side members 200 to the housing 205. In one or more embodiments, the tab 210 can be secured by friction fit within the hole of the side member 205. Adhesive, welding, or one or more projections extending from an outer surface of the tab 210 that can grip or otherwise hold onto the side member 200 can also be used. Screws, pins, rivets, or any other suitable retaining devices are other options for securing the housing 205 to the side members 200.

In one or more embodiments, the side members 200 can be integrally formed with the housing 205. For example, the side members 200 and housing 205 can be formed together using injection molding, insert molding, or rotomolding techniques. In one or more embodiments, two or more materials can be used to integrally form the side members 200 and/or housing 205 using, for example 2K or 3K injection or insert molding techniques.

Two or more segments 115 can be hinged or otherwise articulated with one another. In one or more embodiments, each side member 200 can include a hole or socket 215 formed in a first end 220 thereof, and a tab or protrusion 225 formed at a second end 230 thereof. The tab 225 of a first segment 115 can be adapted to snap into the socket 215 of an adjacent segment ("second segment"). In one or more embodiments, the tab 225 can be replaced with a hole or other opening so that a pin or rod (not shown) can be inserted through two properly positioned segments 115 to articulatingly connect or link two segments 115 together.

The connected segments 115 can rotate about the joint or hinge provided by the tabs 225 inserted into the sockets 215. In one or more embodiments, the degree of rotation of adjacent segments 115 can be limited using one or more stops 235 formed in the second end 230. The second end 230 of each segment can be notched or otherwise have a portion thereof removed to form a recess 240. In operation, a first segment 115 can rotate a predetermined distance relative to a second segment 115 attached thereto before the stop 235 of the first segment contacts the corresponding stop 235 of the second segment 115. When the stop 235 contacts one of the edges 245 of the recess 240, the segment 115 can be prevented from rotating further. Increasing the size or length of the recess 240 can increase the distance or degree two articulatingly connected segments can rotate about the joint provided by the tabs 225 and sockets 215.

In one or more embodiments, each side member 200 can include a recess or guide 250 to facilitate the interconnection of two adjoining segments 115. The guide 250 can help align and direct the tabs 225 of a first segment to the corresponding sockets 215 of a second segment, providing a fast and easy connection of two or more segments 115 to one another.

In one or more embodiments, each side member 200 can include one or more attachment tabs or locators 275. The one or more tool attachment tabs 275 can extend laterally from the side members 200 toward the housing 205. Although not shown, outwardly facing tabs 275 can also be used. The one or more tabs 275 can provide a support and/or a positive means of attachment for one or more tools (not shown). The tabs 275 can also provide a retaining mechanism for the tool to grip, attach, or otherwise secure itself to a particular segment 115 or multiple segments 115. In one or more embodiments, the one or more tabs 275 can be used to determine the distance or length a tool advances along the guide 100. For example, a tool can include a tab counter device that can count one or more tabs 275 as the tool advances which can then be used to determine the tool's position on the track, e.g. how far the tool has traveled. Although not shown, one or more various alternative securing mechanisms can be used to secure a tool to the guide 100. For example, grooves or channels can be provided inside and/or outside the wall or face of the side members 200.

Referring to FIGS. 1 and 2, a plurality of segments 115 can be connected to provide a guide 100 of any desired length. The guide 100 can include a sufficient number of segments 115 to provide a guide 100 having a length ranging from about 10 cm to about 150 m or more. However, to facilitate transportability and ease of installation and use, the guide 100 can be separated into two or more guides 100 each having a length of about 5 m or more, about 4 m or more, about 3 m or more, about 2 m or more, or about 1 m or more. The two or more guides 100 can be connected together or used in series to provide a single guide 100 having a sufficient overall length.

Figure 3:
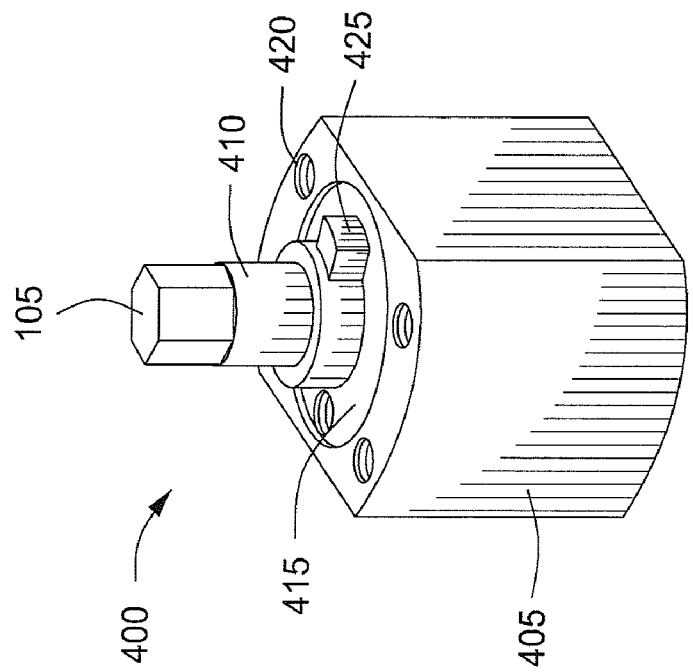
FIG. 3 depicts an isometric view of an illustrative switchable magnet according to one or more embodiments described.

FIG. 3 depicts an isometric view of an illustrative magnet 400, according to one or more embodiments. The magnet 400 can include at least two magnets disposed within a housing 405. The housing 405 can be or include one or more pole pieces. The housing 405 can be made from a material that is ferrimagnetic or ferromagnetic ("magnetically susceptible material") having low magnetic reluctance. Within the housing 405, a first magnet can be held in a fixed position beneath a second magnet that can be rotated about its axis.

A switch 105 can be used to rotate the second magnet within the housing 405. Although not shown, the second magnet or "upper magnet" can include a notch or groove adapted to engage or receive a bar (not shown) in communication with the switch 105. The bar can be received inside a groove formed on a boss 410. The boss 410 can be connected to the switch 105. The switch 105 can have two or more positions, at least one of which is an "on" position and at least one of which is an "off" position.

In one or more embodiments, rotating the upper or second magnet 180° about its axis can align the poles on both the lower magnet and the upper magnet in the "on" position to produce an external magnetic field. When so aligned, the north (positive) and south (negative) poles of the upper magnet can substantially overlie the north and south poles of the lower magnet, creating a strong external magnetic field about the housing 405.

The passive poles that are used to make the housing 405 can enhance the magnetic functionality. The shape or wall thickness of the pole pieces forming the housing 405 can increase or decrease the external magnetic field strength. For example, to provide a higher external magnetic field, the pole pieces can be shaped in such a way that they reflect the variation of the magnetic field strength around the perimeter of the permanently magnetized first and second magnets.

In one or more embodiments, the magnet 400 can further include a top cover 415 that can be fixedly secured to the housing 405 formed by the pole pieces. In one or more embodiments, the top cover 415 can seal the top of the housing 405. In one or more embodiments, the boss 410 can extend through an opening in the top cover 415 and a sealing member (not shown) can provide a water tight and dust proof seal between the boss 410 and the cover 415.

In one or more embodiments, the lower surface of the lower magnet can form part of the lower surface of the magnet 400. In one or more specific embodiments, the lower magnet can be positioned such that it lies adjacent to the lower surface of respective pole pieces providing the housing 405. In one or more embodiments, the lower surface of the device 400 can include a lower cover (not shown), thereby enclosing the lower magnet completely within the housing 405.

In one or more embodiments, the housing 405 can provide a waterproof and/or dustproof housing to protect the magnets housed therein. This can provide a magnet 400 suitable for use in harsh, dusty, and/or wet environments. Additional details of a suitable magnet 400 is further discussed and described in U.S. Pat. Nos. 6,707,360 and 7,012,495 and U.S. Patent Application Publication No. 2004/0239460.

Figure 4:
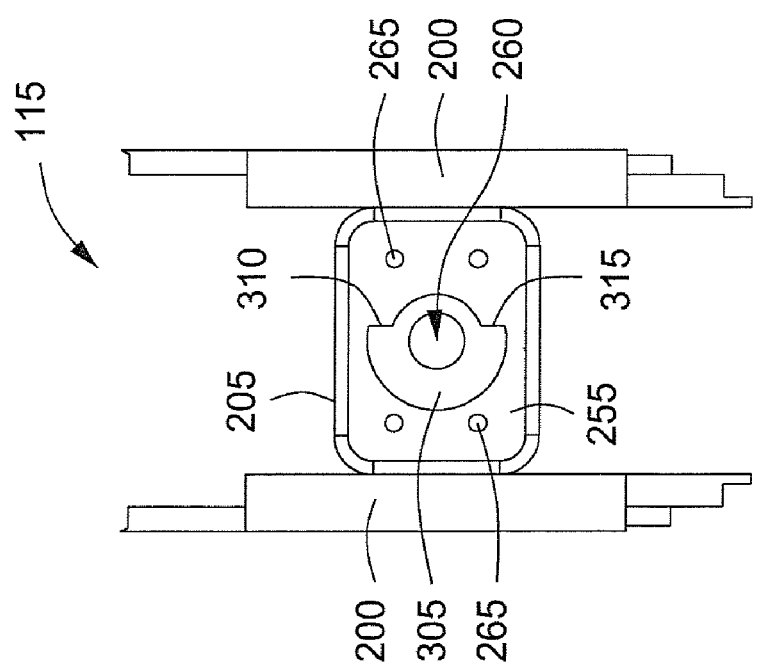
FIG. 4 depicts a bottom view of the segment depicted in FIG. 2.

FIG. 4 depicts a bottom view of the segment 115 depicted in FIG. 2. Referring to FIGS. 2 and 4, the segment 115 can include a panel or cover plate 255 disposed between the side members 200. The cover plate 255 can include a centrally located opening or hole 260. The cover plate 255 can include one or more additional holes or apertures 265 that can be used to insert one or more attachment devices through the cover plate 255 and into the magnet 400 to secure the magnet within the housing 205 of the segment 115.

Figure 5:
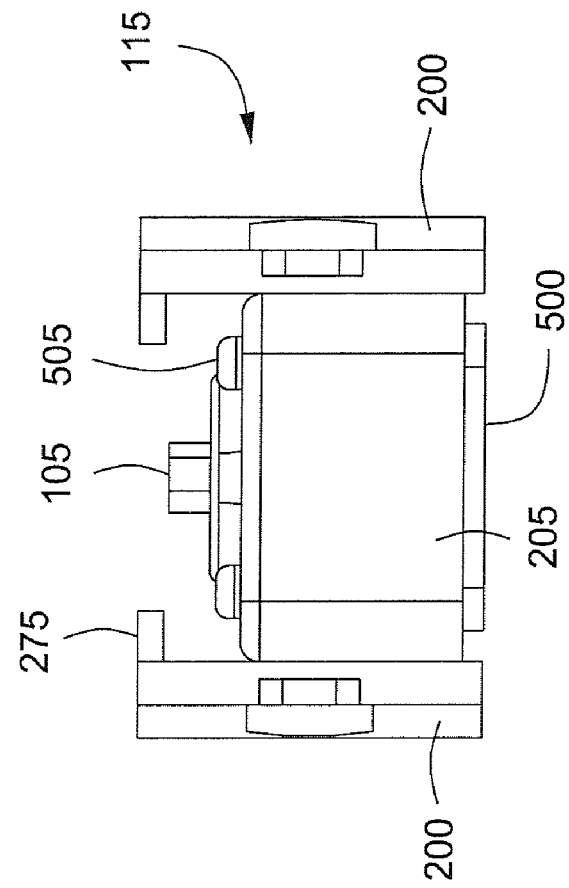
FIG. 5 depicts a side view of the segment depicted in FIG. 2.

FIG. 5 depicts a side view of the segment 155 depicted in FIG. 2 having the magnet 400 disposed therein. Referring to FIGS. 4 and 5, the switch 105 on the magnet 400 can be aligned and inserted through the opening 260 of the cover plate 255 of the segment housing 205. The magnet 400 can then be attached or otherwise secured to the segment housing 205 using an adhesive, screw, bolt, rivet, or similar attachment member 505. The magnet housing 405 can include one or more holes 420 (shown in FIG. 3) for receiving the attachment member 505.

Referring again to FIG. 5, the magnetic side or face 500 from which the magnetic field can flow when the magnet 400 is switched "on" can be flush or even with a lower surface or edge of the side members 200. When the magnetic side 500 is flush with the side members 200, the magnet 400 can directly contact a magnetically susceptible surface (not shown). Direct contact with a magnetically susceptible surface can provide a detachable connection between the segment 115 and the surface via the magnetic field generated by the magnet 400 when the switch 105 is in the "on" position. The lower surface 500 of the magnet 400 can include a lower panel (not shown) rather than having the lower magnet directly exposed.

Although not shown, the magnet 400 can be positioned within the housing 205 of the segment 115 such that the lower surface (the "magnetic side") 500 can be recessed, i.e. not even with the lower surface of the side members 200. The magnetic side 500 can be positioned such that the side members 200 can act as a guard for the magnetic side 500. For example, the side members 200 can prevent or reduce damage to the magnet 400 that can be caused by forcefully contacting the magnet 400 with a magnetically susceptible surface. If the magnet 400 is turned on before the releasable segment 115 is placed on a magnetically susceptible surface to which it is to be releasably attached, the magnetic force exerted by the magnet 400 can cause the magnet to forcefully strike the magnetically susceptible surface, possibly causing physical damage to the magnet 400. Such damage can include cracking or misalignment of the one or more magnets. Therefore, the magnet 400 can be slightly recessed in the segment 115, to protect the magnet 400 while remaining sufficiently close to the magnetically susceptible surface to ensure solid attachment. The magnet 400 can be recessed by about 0.25 mm or more, about 0.5 mm or more, about 0.75 mm or more, about 1 mm or more, about 1.25 mm or more, or about 1.5 mm or more.

Referring again to FIG. 4, a lower surface of the cover plate 255 can include a notch or recessed section 305 formed therein. The recessed section 305 includes a first stop 310 and a second stop 315 at opposing ends thereof. The switch 105 on the magnet 400 can include a tab or other protruding member 425 that can be disposed within the recessed section 305 so that the recessed section 305 provides a guide or track for the tab 425 on the magnet 400. The stops 310, 315 on the cover plate 255 limit the rotation of the switch 105, which corresponds to the "on" and "off" positions of the magnet 400. When the switch 105 is in the "on" position the tab 425 can be proximate a first stop or "on" stop 310. When the switch 105 is in the "off" position the tab 425 can be proximate the second stop or "off" stop 315.

Referring again to FIG. 1, the magnet 400 can be attached on, in, or about any number of segments 115. For example, the guide 100 can include any number of empty segments 115 adjacent or situated between any number of segments 115 having a magnet 400 disposed therein. As used herein, the term "empty" refers to a segment 115 that does not include a magnet.

The switchable magnets 400 can be attached on, in, or about any number of segments 115 in any order, frequency, or pattern about the guide 100. For example, the switchable magnets can be attached on, in, or about every segment 115, every other segment 115, every third segment 115, every fourth segment 115, every fifth segment 115, every sixth segment 115, every seventh segment 115, or any other desired pattern or combination of patterns. In one or more embodiments, sets of two adjacent segments 115 with each segment including a switchable magnet can be spaced apart by one or more empty segments 115, two or more empty segments 115, three or more empty segments 115, or any other desired pattern or combination of patterns.

The magnetic field provided by the magnet 400 can be of sufficient intensity or strength to attach the guide 100 to a magnetically susceptible surface (not shown), such as a metal sheet, plate or pipe. The guide 100 can be releasably attached to the magnetically susceptible surface. When the switch 105 is in the "off" position, the magnetic field can be eliminated or reduced to a negligible strength thereby releasing the guide 100 from the magnetically susceptible surface. In this way, all or a portion of the guide 100 can be positioned on a magnetically susceptible surface, and the one or more switchable magnets 400 can be switched to the "on" position. When work on the surface is complete, any one or more of the magnets can be switched to the "off" position to remove the guide 100 or a section of the guide 100 from the work surface.

Figure 6:
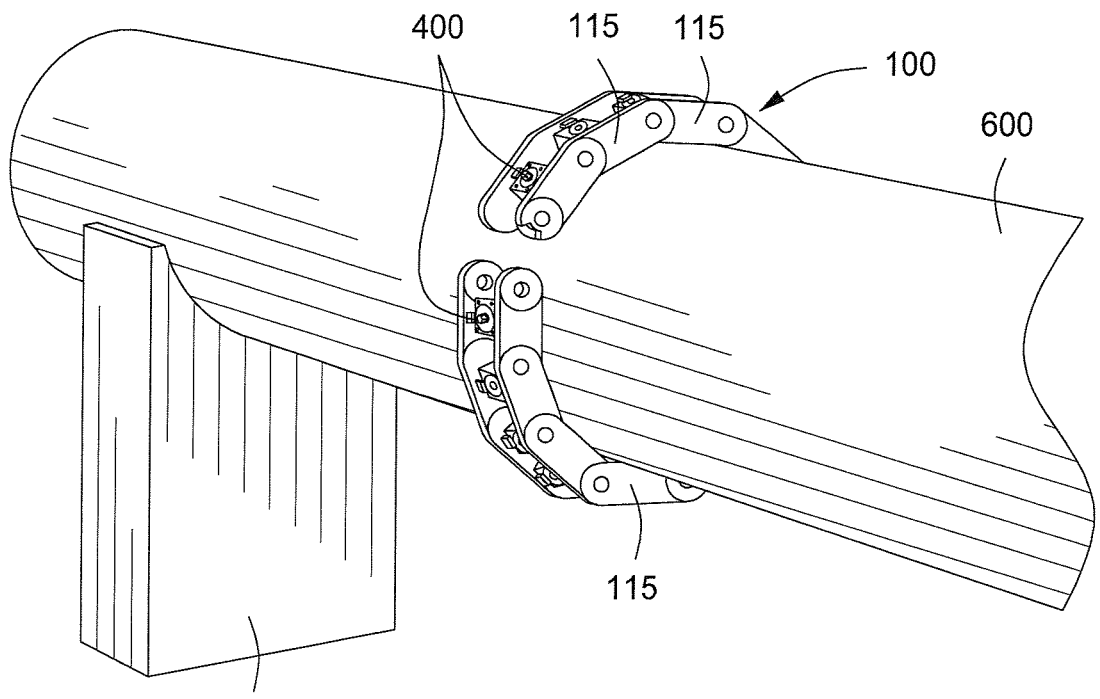
FIG. 6 depicts an isometric view of an illustrative guide releasably attached to a work piece, according to one or more embodiments described.

FIG. 6 depicts an isometric view of an illustrative guide 100 releasably attached to a work piece 600. The work piece 600 is depicted as a tubular member or pipe although the work piece 600 can be any number of magnetically susceptible surfaces including, but not limited to, ship hulls, tanker walls, storage tanks, pipes of varying diameter, process equipment used in refinery plants, storage compartments, steel plates, and the like.

As shown in FIG. 6, the guide 100 can be disposed on an outer diameter of the pipe 600. Although not shown, the guide 100 can be disposed about at least a portion of any other type of round or curved structure. As the guide 100 is placed about the pipe 600, any one or all of the magnets 400 can be switched to the "on" position to provide a holding force to the pipe 600. The magnetic field generated by the magnet 400 when the switch 105 is in the "on" position can cause at least a portion of the guide 100 to become releasably attached to the magnetically susceptible surface of the pipe 600. As discussed in further detail below, the guide 100, after being releasably attached, to the pipe 600 can provide a track upon or by which a tool (not shown) can be guided along at least a portion thereof. Although not shown, the guide 100 can be removably connected about at least a portion of the inside diameter of the pipe 600 or the interior of other round or curved structures.

In one or more embodiments, the end segments 115 can be adapted to align and attach by any suitable method. As described above, for example, the tab 225 of a first end segment 115 can interconnect with the recess 215 formed in the second end segment 115 to provide a continuous guide 100. Other suitable connectors can include, but are not limited to clips, snaps, screws and brackets, bolts and nuts, and the like.

In at least one specific embodiment, the length of the guide 100 can be such that opposite ends of the guide 100 are proximate when placed around the work piece, e.g. a pipe, thereby providing a continuous guide 100. A magnet 400 can be located close to each end of the guide 100 to hold the ends of the guide 100 in place and to provide a continuous guide 100 about the object.

Figure 7:
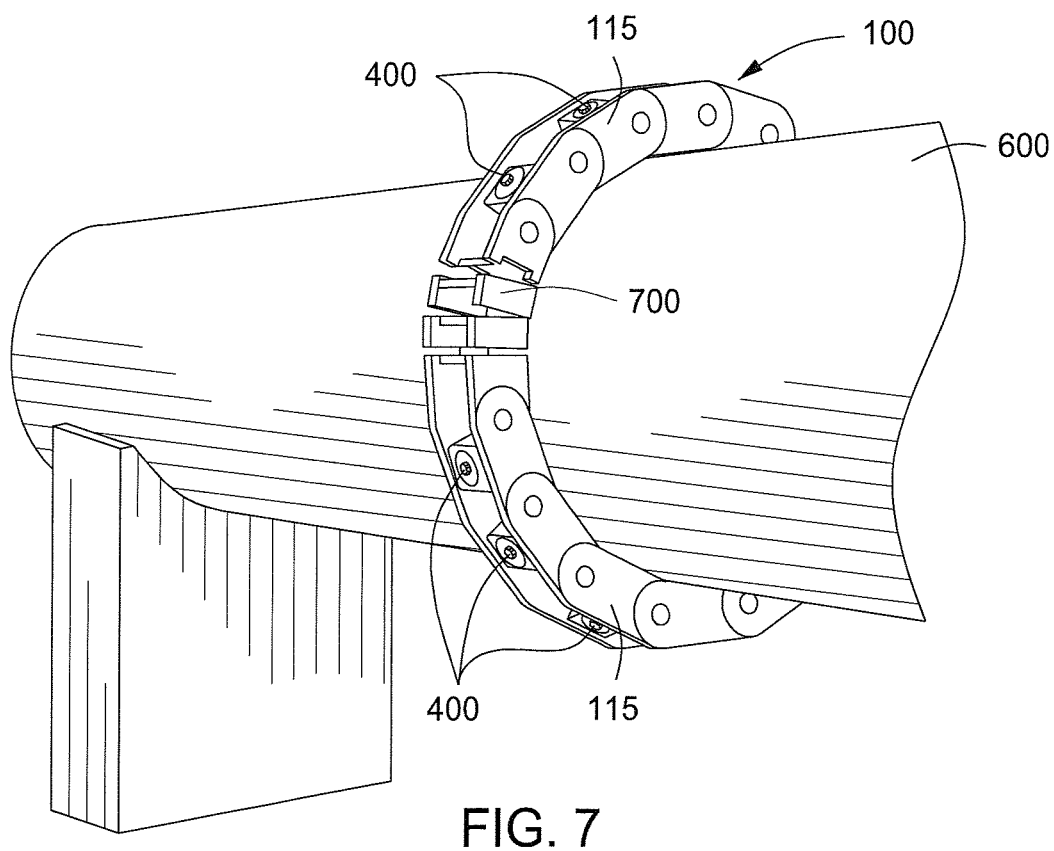
FIG. 7 depicts another isometric view of an illustrative guide releasably attached to a work piece, according to one or more embodiments described.

In one or more embodiments, a connector or adapter 700 can be used to connect two ends of the guide 100, as depicted in FIG. 7. FIG. 7 depicts an isometric view of an illustrative guide 100 using a connector 700, according to one or more embodiments. As depicted, a connector 700 can be placed between the ends of the guide 100 to join the ends. The connector 700 can have varying lengths to accommodate varying distances between two end segments 115. In one or more embodiments, two connectors 700 can be used. A first connector 700 can be welded or otherwise attached to a first end segment 115, and a second connector 700 can be welded or otherwise attached to a second end segment 115. Each connector 700 can be equipped with an attachment mechanism (not shown), i.e. male and female connectors, so as to releasably connect with one another.

Connection of the end segments 115 of the guide 100 around an object, such as a pipe, pole, or other circular or semi-circular object can provide a "closed" or "continuous" track about which one or more tools can follow. Illustrative tools can include, but are not limited to welding heads; cutting heads; weld inspection devices, such as ultrasonic inspection devices, x-ray inspection devices, visual inspection devices, eddy current inspection devices, and the like. For simplicity and ease of description, the guide 100 will be further described with reference to a welding operation as depicted in FIG. 8.

Figure 8:
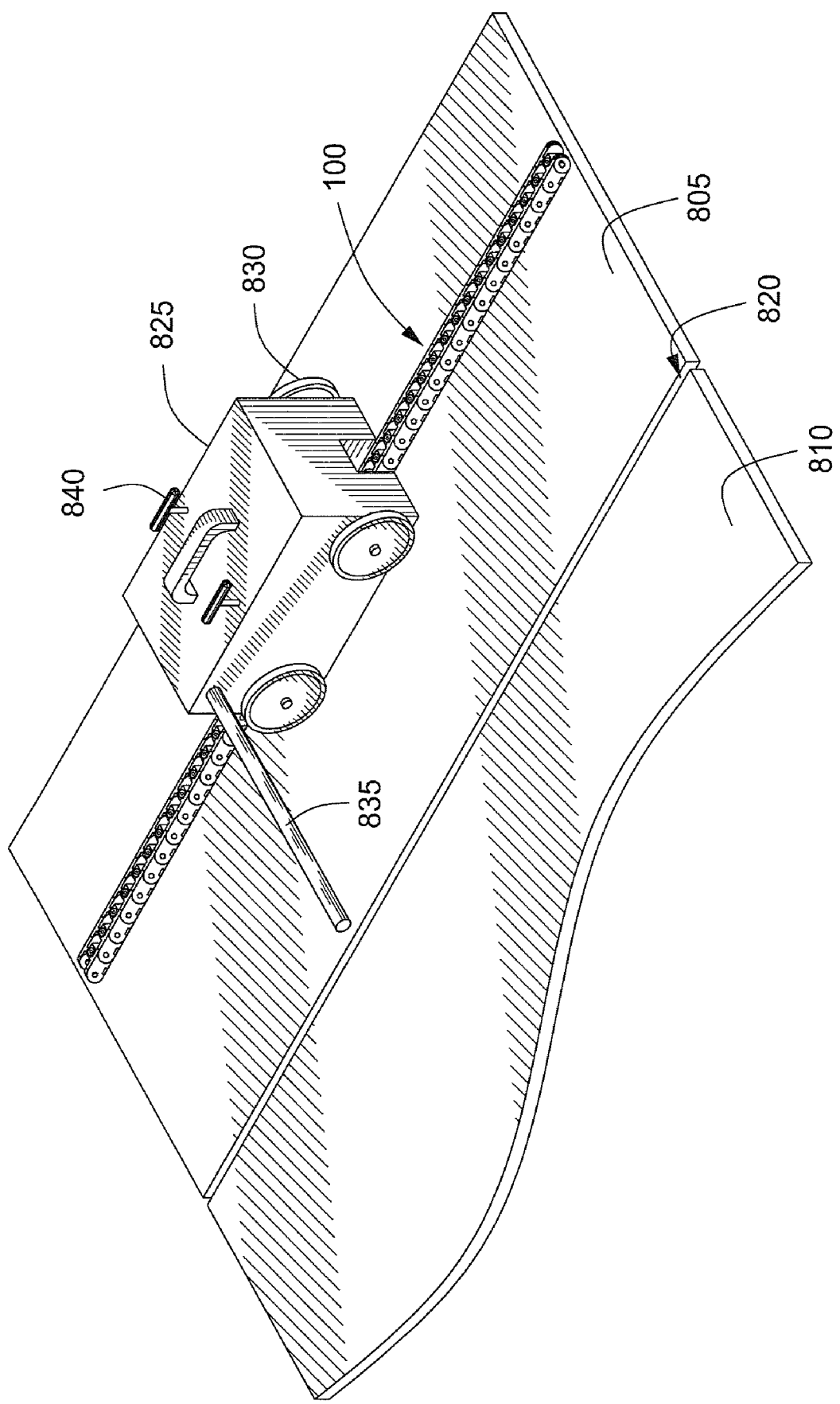
FIG. 8 depicts an illustrative system for guiding a tool along a length of a weld seam, according to one or more embodiments described.

FIG. 8 depicts an illustrative system for guiding a tool 825 along a length of a weld seam 820 between two magnetically susceptible surfaces 805, 810. In one or more embodiments, the guide 100 can be releasably attached to a first magnetically susceptible surface, such as a sheet of ferrous metal 805 by positioning the guide 100 on the surface and switching the one or more magnets 400 to the "on" position. The guide 100 can be positioned at a predetermined distance along at least a portion of the seam 820 so that the tool 825 placed thereon can be located in a working position about the seam 820.

Although not required, the tool 825 can include one or more wheels 830 to advance the tool along a length of the guide 100. In one or more embodiments, the tool 825 can include an attachment rod 835 for holding the welding head thereon. The tool 825 can advance along at least a portion of the guide 100 at any rate suitable for welding the seam 820.

The tool 825 can be electrically powered, gas powered, or manually moved. The tool 825 can be pulled or pushed along at least a portion of the guide 100. The tool 825 can be automatically moved, e.g. computer controlled, or manually moved, e.g. by a person directing controls along the guide 100.

In one or more embodiments, the one or more welding heads or welding methods can include any suitable welding method or welding methods. For example, the one or more welding heads (not shown) can include, but are not limited to gas tungsten arc welding ("GTAW"), gas metal arc welding ("GMAW"), pulsed gas metal arc welding ("GMAW-P"), flux core arc welding ("FCAW"), shielded metal arc welding ("SMAW"), pulsed flux core arc welding ("FCAW-P"), plasma arc welding ("PAW"), submerged arc welding ("SAW"), laser welding, Oxy-Acetylene welding, resistance welding, ultrasound welding, atomic hydrogen welding, carbon arc welding, electroslag welding, electrogas welding, stud arc welding, or any combination thereof. In one or more embodiments, the one or more welding heads can weld any type of weld joint. For example, the one or more welding heads can weld a butt joint, lap joint, corner joint, edge joint, T-joint, single-V joint, double V-joint, and the like.

In one or more embodiments, a cutting head (not shown) can be secured to the tool 825 or to the attachment rod 835. In one or more embodiments, the guide 100 can be releasably attached to a sheet of metal or pipe at a predetermined distance along at least a portion of a length of a cut to be made. Rather than welding a seam, the tool 825 can be configured to cut a plate, pipe, or other piece of magnetically susceptible material. In one or more embodiments, the tool 825 can automatically advance along a length of the guide 100. During the advancement of the tool 825 a welding head (not shown) can automatically weld a seam 820 to provide two joined sheets of metal 805, 810. In one or more embodiments, during the advancement of the tool 825 one or more cutting heads (not shown) can automatically cut a pipe, or sheet of metal into two or more pieces. For example, one or more cutting head can be placed on two sides of the tool 825 which can cut a strip or seam out of a piece of metal. In one or more embodiments, the one or more cutting heads or cutting methods can include any suitable cutting method. For example, the cutting head can include, but is not limited to a plasma cutter, Oxy-fuel cutter, saw blades, and the like.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for guiding a tool, comprising:
an elongated member having one or more switchable magnets disposed thereon, wherein the one or more switchable magnets comprises a contact side that is switchable between a first state and a second state, wherein the one or more switchable magnets emits a greater magnetic field therefrom in the first state relative to the second state, wherein the contact side of the one or more switchable magnets is configured to secure the elongated member to a magnetically susceptible surface when in the first state, and wherein the contact side is in direct contact with the magnetically susceptible surface or within about 15 mm from the magnetically susceptible surface when the elongated member is secured to the magnetically susceptible surface.

2. The apparatus of claim 1, wherein the elongated member is flexible along a longitudinal axis thereof.

3. The apparatus of claim 1, wherein the elongated member is constructed of a non-magnetic material selected from the group consisting of polyolefin, carbon fiber, aluminum, magnesium, ceramic, wood, resins, and fiber glass.

4. The apparatus of claim 1, wherein the one or more switchable magnets comprises a housing, a first permanent magnet and a second permanent magnet disposed within the housing, and a switch for causing rotation of the second permanent magnet relative to the first permanent magnet.

5. The apparatus of claim 4, wherein the first permanent magnet is held in a fixed position within the housing, and wherein the switch causes the second permanent magnet to rotate about an axis relative to the first permanent magnet.

6. The apparatus of claim 4, wherein the housing is fixedly secured to the elongated member.

7. The apparatus of claim 1, wherein the elongated member comprises at least two segments that are hinged together.

8. An apparatus for guiding one or more tools, comprising:
an elongated body comprising at least two segments that are hinged together; and
one or more switchable magnets disposed on at least one of the segments, wherein each segment comprises two side walls disposed about a body, the body providing a first housing for the magnet, wherein the one or more switchable magnets each comprise a first state and a second state, and wherein the one or more switchable magnets each emit a greater magnetic field therefrom in the first state relative to the second state.

9. The apparatus of claim 8, wherein the one or more switchable magnets each comprise a contact side configured to secure the elongated body to a magnetically susceptible surface when in the first state.

10. The apparatus of claim 9, wherein the contact side is in direct contact with the magnetically susceptible surface or within about 1.5 mm from the magnetically susceptible surface when the elongated body is secured to the magnetically susceptible surface.

11. The apparatus of claim 8, wherein each side wall comprises a socket formed in a first end thereof and a protrusion disposed on a second end thereof.

12. The apparatus of claim 8, wherein the at least two segments comprise a non-magnetic material.

13. The apparatus of claim 8, wherein each segment is constructed of a material selected from the group consisting of polyolefin, carbon fiber, aluminum, magnesium, ceramic, wood, resins, and fiber glass.

14. The apparatus of claim 8, wherein the at least two segments are independent and rigid structures when free of the one or more switchable magnets.

15. The apparatus of claim 8, wherein the one or more switchable magnets comprises a second, a first permanent magnet and a second permanent magnet disposed within the second housing, and a switch for causing rotation of the second permanent magnet relative to the first permanent magnet.

16. The apparatus of claim 8, wherein at least one of the at least two segments does not contain a switchable magnet disposed thereon.

17. The apparatus of claim 8, wherein the one or more switchable magnets are disposed on less than all of the at least two segments.

18. The apparatus of claim 8, wherein the at least two segments comprise one or more first segments and one or more second segments, wherein the one or more switchable magnets are disposed on the one or more first segments, and wherein the one or more second segments are free of any switchable magnet.

19. A method for guiding one or more tools comprising:
locating a guide on a first magnetically susceptible surface, the guide comprising:
an elongated body comprising at least two segments that are hinged together; and
one or more switchable magnets disposed on at least one of the segments, wherein each segment comprises two side walls disposed about a body, the body providing a first housing for the one or more switchable magnets;
securing at least a portion of the guide to the first magnetically susceptible surface by switching at least one of the one or more switchable magnets to an on position;
positioning one or more tools about the guide; and
moving the one or more tools along at least a portion of the guide.

20. The method of claim 19, wherein the one or more switchable magnets comprises a contact side, and wherein the contact side is in direct contact with the first magnetically susceptible surface or within about 1.5 mm from the first magnetically susceptible surface when at least a portion of the guide is secured to the first magnetically susceptible surface.

21. The method of claim 19, wherein the tool comprises an automated tool.

22. The method of claim 19, wherein the guide is placed at a predetermined distance from a seam between the first magnetically susceptible surface and a second magnetically susceptible surface.

23. The method of claim 19, wherein the guide is placed at a predetermined distance from a seam between the first magnetically susceptible surface and a second magnetically susceptible surface; and wherein the tool welds at least a portion of the seam to provide a welded seam.

24. The method of claim 19, wherein the tool is adapted to cut at least a portion of the first magnetically susceptible surface.

25. The method of claim 19, wherein the one or more switchable magnets comprises a second housing, a first permanent magnet and a second permanent magnet disposed within the second housing, and a switch for causing rotation of the second permanent magnet relative to the first permanent magnet.

26. The method of claim 19, wherein the at least two segments are independent and rigid structures when free of the one or more switchable magnets.

27. The method of claim 26, wherein each side wall comprises a socket formed in a first end thereof and a protrusion disposed on a second end thereof.

28. The method of claim 19, wherein the at least two segments comprise a non-magnetic material.

29. The method of claim 19, wherein the one or more switchable magnets emits a greater magnetic field therefrom when in the on position relative to when in an off position.

30. The apparatus of claim 19, wherein the one or more switchable magnets are disposed on less than all of the at least two segments.

* * * * *

UNITED STATES PATENT AND TRADEMARK OFFICE
CERTIFICATE OF CORRECTION

PATENT NO. : 8,310,324 B2
APPLICATION NO. : 12/101844
DATED : November 13, 2012
INVENTOR(S) : Will Harris and Gerald Dasbach Page 1 of 1

It is certified that error appears in the above-identified patent and that said Letters Patent is hereby corrected as shown below:

Claim 1, column 8, line 67: "15 mm" should read --1.5 mm--

Claim 15, column 9, line 55: "switchable magnets comprises a second, a first permanent" should read --switchable magnets comprises a second housing, a first permanent--

Signed and Sealed this
Twenty-sixth Day of February, 2013

Teresa Stanek Rea
*Acting Director of the United States Patent and Trademark Office*